US009230180B2

(12) United States Patent
Zhang et al.

(10) Patent No.: US 9,230,180 B2
(45) Date of Patent: Jan. 5, 2016

(54) EYES-OFF-THE-ROAD CLASSIFICATION WITH GLASSES CLASSIFIER

(71) Applicants: GM GLOBAL TECHNOLOGY OPERATIONS LLC, Detroit, MI (US); CARNEGIE MELLON UNIVERSITY, Pittsburgh, PA (US)

(72) Inventors: Wende Zhang, Troy, MI (US); Dan Levi, Kyriat Ono (IL); Debbie E. Nachtegall, Rochester Hills, MI (US); Fernando De la Torre, Pittsburgh, PA (US); Franscisco Vicente, Pittsburgh, PA (US)

(73) Assignees: GM GLOBAL TECHNOLOGY OPERATIONS LLC, Detroit, MI (US); CARNEGIE MELLON UNIVERSITY, Pittsburgh, PA (US)

( * ) Notice: Subject to any disclaimer, the term of this patent is extended or adjusted under 35 U.S.C. 154(b) by 171 days.

(21) Appl. No.: 14/041,105

(22) Filed: Sep. 30, 2013

(65) Prior Publication Data
US 2014/0205143 A1 Jul. 24, 2014

Related U.S. Application Data

(60) Provisional application No. 61/754,515, filed on Jan. 18, 2013.

(51) Int. Cl.
*G06K 9/00* (2006.01)
(52) U.S. Cl.
CPC .................. *G06K 9/00845* (2013.01)
(58) Field of Classification Search
None
See application file for complete search history.

(56) References Cited

U.S. PATENT DOCUMENTS

| | | | | |
|---|---|---|---|---|
| 5,859,921 A * | 1/1999 | Suzuki | ................. | G08B 21/06 382/118 |
| 5,905,563 A * | 5/1999 | Yamamoto | ................. | 351/210 |
| 6,714,665 B1 * | 3/2004 | Hanna | ................. | G06K 9/00 382/106 |
| 7,391,900 B2 * | 6/2008 | Kim et al. | ................. | 382/164 |
| 2001/0036298 A1 * | 11/2001 | Yamada et al. | ................. | 382/118 |
| 2003/0142099 A1 * | 7/2003 | Deering et al. | ................. | 345/531 |
| 2003/0209893 A1 * | 11/2003 | Breed et al. | ................. | 280/735 |
| 2006/0045382 A1 * | 3/2006 | Adachi | ................. | G06K 9/00248 382/291 |
| 2007/0291983 A1 * | 12/2007 | Hammoud | ................. | G06T 7/20 382/103 |
| 2008/0065468 A1 * | 3/2008 | Berg et al. | ................. | 705/10 |
| 2009/0034801 A1 * | 2/2009 | Hammoud | ................. | 382/107 |
| 2010/0208205 A1 * | 8/2010 | Tseng et al. | ................. | 351/209 |
| 2010/0254571 A1 * | 10/2010 | Matsuura | ................. | G06K 9/3266 382/103 |
| 2011/0142335 A1 * | 6/2011 | Ghanem | ................. | G06F 17/3025 382/165 |
| 2012/0200404 A1 * | 8/2012 | Morris | ................. | 340/438 |
| 2012/0308124 A1 * | 12/2012 | Belhumeur et al. | ................. | 382/159 |
| 2013/0187845 A1 * | 7/2013 | Madau et al. | ................. | 345/156 |

OTHER PUBLICATIONS

Kaminski et al. "Single image face orientation and gaze detection", Jun. 13, 2008, Springer-Verlag, Machine Vision and Applications, 21:85-98.*
Vicente et al., "Driver Gaze Tracking and Eyes Off the Road Detection System," 2015, IEEE Transactions on Intelligent Transportation Systems, pp. 1-14.*
Wang et al., Driver Fatigue Detection Technology in Active Safety Systems, Jun. 24-26, 2011, IEEE RSETE 2011, pp. 3097-3100.*

* cited by examiner

*Primary Examiner* — Jason Heidemann

(57) ABSTRACT

A method for determining an Eyes-Off-The-Road (EOTR) condition exists includes capturing image data corresponding to a driver from a monocular camera device. A detection of whether the driver is wearing eye glasses based on the image data using an eye glasses classifier. When it is detected that the driver is wearing eye glasses, a driver face location is detected from the captured image data and it is determined whether the EOTR condition exists based on the driver face location using an EOTR classifier.

19 Claims, 4 Drawing Sheets

EYES-OFF-THE-ROAD CLASSIFICATION WITH GLASSES CLASSIFIER

CROSS REFERENCE TO RELATED APPLICATIONS

This application claims the benefit of U.S. Provisional Application No. 61/754,515, filed on Jan. 18, 2013, which is incorporated herein by reference.

TECHNICAL FIELD

This disclosure is related to monitoring of a vehicle driver and determining whether the driver's view is off the road.

BACKGROUND

The statements in this section merely provide background information related to the present disclosure. Accordingly, such statements are not intended to constitute an admission of prior art.

Vehicles having the ability to monitor an operator of a vehicle and detect that the operator is not paying attention to the road scene allow for measures to be taken to prevent a vehicle collision due to the operator not paying attention. For instance, warning systems can be enabled to alert the driver that he or she is not paying attention. Further, automatic braking and automatic steering systems can be enabled to bring the vehicle to a stop if it is determined that the driver has not become attentive even after being warned.

It is known to utilize driver-monitoring camera devices configured to monitor a driver and detect an Eyes-Off-The-Road (EOTR) condition indicating that the driver's eyes are off the road based on an estimated gaze direction of the driver. However, performance is degraded when the driver is wearing eye glasses because estimations of the driver's gaze direction are unreliable. Likewise, when the driver is wearing sunglasses estimations of the driver's gaze direction are not available.

SUMMARY

A method for determining an Eyes-Off-The-Road (EOTR) condition exists includes capturing image data corresponding to a driver from a monocular camera device. A detection of whether the driver is wearing eye glasses based on the image data using an eye glasses classifier. When it is detected that the driver is wearing eye glasses, a driver face location is detected from the captured image data and it is determined whether the EOTR condition exists based on the driver face location using an EOTR classifier.

BRIEF DESCRIPTION OF THE DRAWINGS

One or more embodiments will now be described, by way of example, with reference to the accompanying drawings, in which.

DETAILED DESCRIPTION

Figure 1:
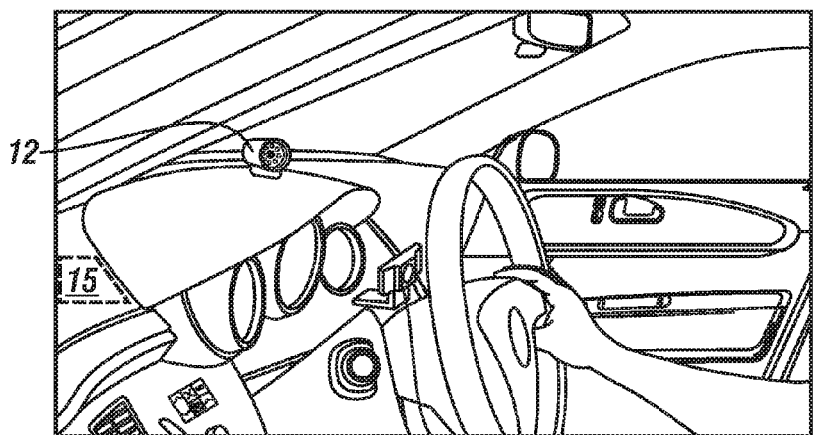
FIG. 1 illustrates an exemplary non-limiting view of components of a driver monitoring system within a vehicle, in accordance with the present disclosure.

Referring now to the drawings, wherein the showings are for the purpose of illustrating certain exemplary embodiments only and not for the purpose of limiting the same, FIG. 1 illustrates an exemplary non-limiting view of components of a driver monitoring system within a vehicle, in accordance with the present disclosure. The driver monitoring system includes an in-vehicle monocular camera 10 configured to capture image data in a field of view (FOV) directed toward a driver of the vehicle. The captured image data includes video streams that include a plurality of images frames captured in succession. The camera device 10 is capable of receiving light, or other radiation, and converting the light energy to electrical signals in a pixel format using, for example, one of charged couple device (CCD) sensors or complimentary metal-oxide-semiconductor (CMOS) sensors. The camera device 10 is in signal communication with a non-transitory processing device 15 configured to receive the captured image data and output a detection of whether or not the driver is wearing eye glasses and a determination of whether or not an Eyes-Off-The-Road (EOTR) condition exists. As used herein, the term "EOTR condition" refers to a determination that the driver's eyes are currently not focused upon the road/driving scene. The processing device 15 may be implemented within any suitable compartment of the vehicle capable of receiving image input data captured by the camera device 10. The camera device 10 is mounted within an interior of the vehicle. In one embodiment, the camera device 10 is mounted on a vehicle dashboard above a steering wheel column. The driver monitoring system further includes an infrared illuminator 12 configured to project infrared light in a direction toward the driver such that a clear image of the driver's face is obtained by the camera device 10 during low-light conditions such as during night time. Opposed to utilizing a direct light source, infrared light does not impact the vision of the driver. Moreover, captured image data does not suffer from a "bright pupil" produced when near-infrared light sources are utilized. In one embodiment, the camera device does not include an infrared filter that blocks infrared light beyond predetermined wavelengths. Embodiments herein are directed toward using image data captured by the camera device 10 to detect whether or not the EOTR condition exists even when the driver is wearing eye glasses and without the use of high spatial and temporal resolution inputs, and thus, removing the necessity of expensive cameras and lenses.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
FIG. 2 illustrates non-limiting image data of a driver of the vehicle captured by a camera device of FIG. 1, in accordance with the present disclosure.

FIG. 2 illustrates non-limiting image data of the driver captured by the camera device of FIG. 1, in accordance with the present disclosure. In the illustrated embodiment, the driver is wearing eye glasses 50. As used herein, the term "eye glasses" refers to any type of corrective eye glasses, sunglasses, goggles, protective eye glasses or any other form of eye glasses including lenses that cover the driver's eyes. Region 20 includes an EOTR region that includes image data for monitoring at least one of driver head position, facial feature points, and information of the eyes of the driver. In one embodiment, the EOTR region is monitored to extract visual features from the driver's face to allow for driver face tracking, wherein information of the eyes of the driver can be extracted from the face tracking. Information of the eyes of the driver may be ultimately used to estimate a gaze location of the driver and determine the EOTR condition therefrom. However, EOTR conditions based upon estimated gaze locations can result in false detections when the driver is wearing eye glasses due to the ability to extract information of the eyes of the driver being restricted from the face tracking. Accordingly, determining the existence of the EOTR condition requires knowledge of whether or not the driver is wearing eye glasses such that an appropriate method can be selected for determining existence of the EOTR condition.

Figure 3:
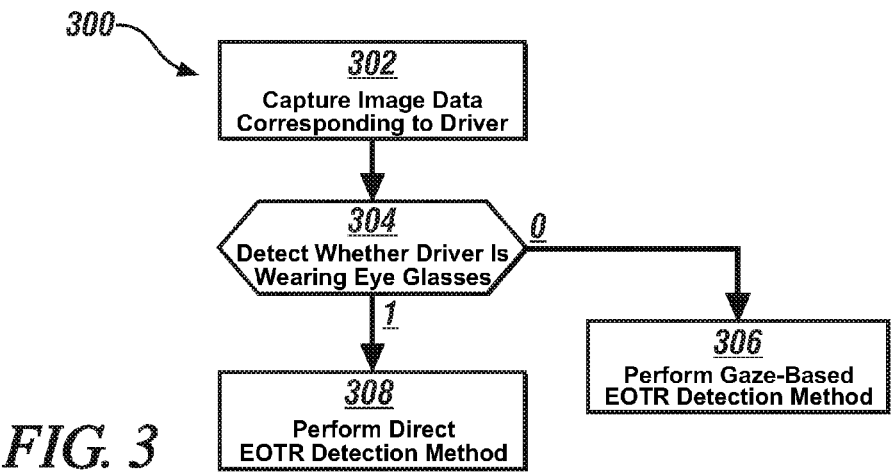
FIG. 3 illustrates an exemplary flowchart for selecting one of two methods for determining whether or not an Eyes-Off-The-Road (EOTR) condition exists, in accordance with the present disclosure.

FIG. 3 illustrates an exemplary flowchart 300 for selecting one of two methods for determining whether or not the EOTR condition exists, in accordance with the present disclosure. The exemplary flowchart 300 can be implemented within, and executed by, the non-transitory processing device 15 of FIG. 1. Referring to block 302, image data corresponding to the driver is captured by the camera device 10 of FIG. 1. Decision block 304 detects whether or not the driver is wearing eye glasses based on the image data using an eye glasses classifier. When decision block 304 detects that the driver is not wearing eye glasses as denoted by a "0", a gaze-based EOTR detection method is performed at block 306. If decision block 304 detects that the driver is wearing eye glasses as denoted by a "1", a direct EOTR detection method using extracted pose information from the driver classified by an EOTR classifier is performed at block 308. Embodiments herein are directed toward the direct EOTR detection method when it is detected that the driver is wearing eye glasses. The direct EOTR detection method of block 306, the EOTR condition can be detected directly from extracted visual features, e.g., driver facial features, without relying on estimations of the gaze direction of the driver. Accordingly, decision block 304 executes an eye glasses classifier to detect whether or not the driver is wearing eye glasses and block 308 executes an EOTR classifier to determine whether or not the EOTR condition exists based on a face location of the driver.

Figure 4:
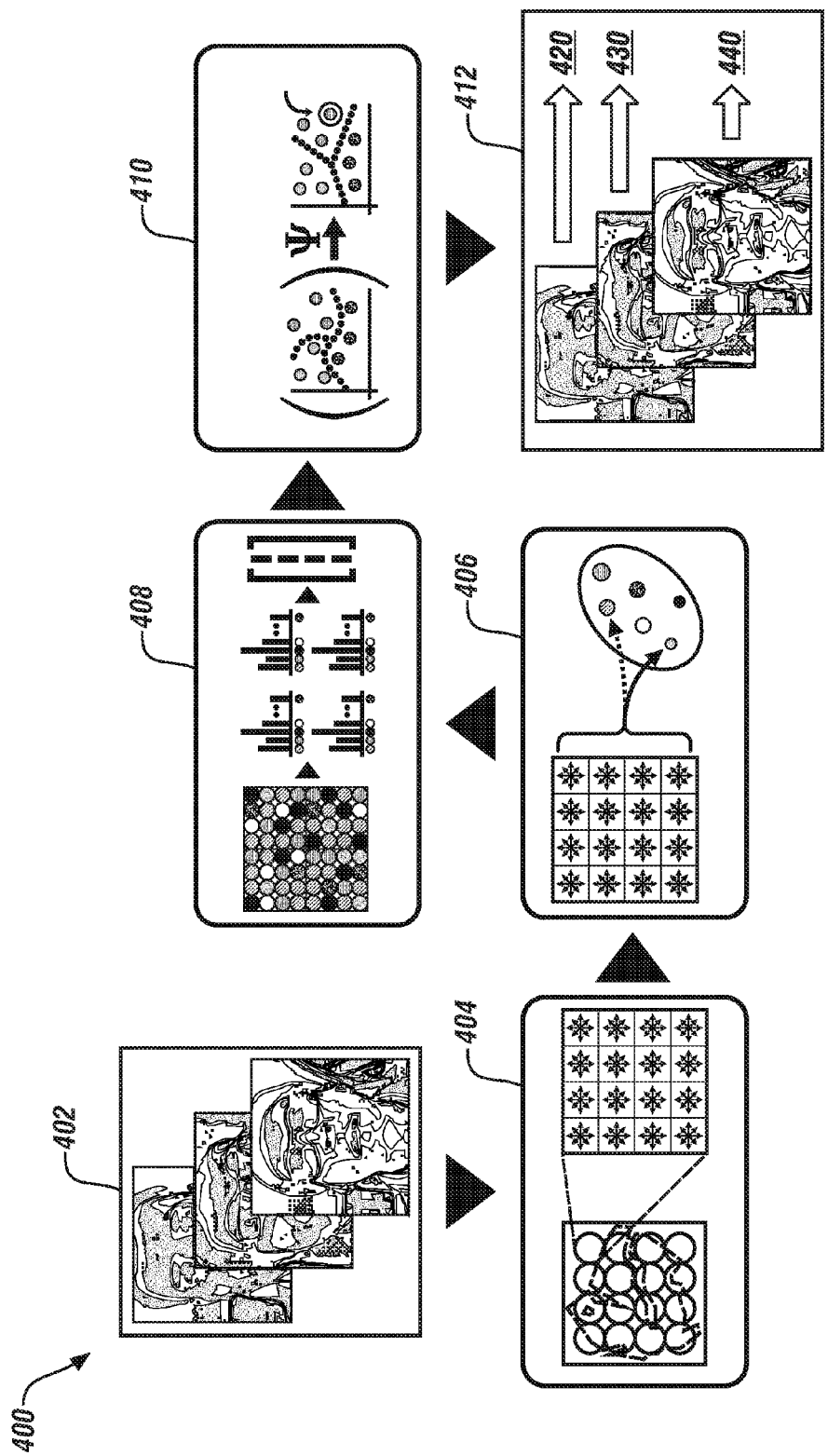
FIG. 4 illustrates an exemplary flowchart of decision block 304 of FIG. 3 for detecting whether or not the driver of FIG. 2 is wearing eye glasses, in accordance with the present disclosure.

FIG. 4 illustrates an exemplary flowchart 400 of decision block 304 of FIG. 3 for detecting whether or not the driver of FIG. 2 is wearing eye glasses, in accordance with the present disclosure. The exemplary flowchart 400 can be implemented within, and executed by the non-transitory processing device 15 of FIG. 1. Table 1 is provided as a key to FIG. 4 wherein the numerically labeled blocks and the corresponding functions are set forth as follows.

TABLE 1

| BLOCK | BLOCK CONTENTS |
|---|---|
| 402 | Obtaining image data captured by the camera device that corresponds to the driver. |
| 404 | Extracting visual features from the captured image data. |
| 406 | Quantizing the extracted visual features using a dictionary of multiple visual words obtained by a clustering routine. |
| 408 | Pooling the quantized visual features to generate a spatial histogram of the visual words. |
| 410 | Classifying the spatial histogram using an eye glasses classifier. |
| 412 | Detecting whether or not the driver is wearing eye glasses based on the classification of the spatial histogram. |

Referring to block 402, an input image is obtained that includes the image data corresponding to the driver that is captured by the camera device 10 of FIG. 1. In one embodiment, the input image includes a detected face of the driver. The driver may be wearing regular eye glasses, sunglasses or may not be wearing any eye glasses. However, it is not known in block 402 whether or not the driver is wearing regular eye glasses, sunglasses or not wearing any eye glasses. As used herein, the term "regular eye glasses" refers to any corrective, protective or other type of eye glasses having clear lenses.

Block 404 extracts visual features from the captured image data. The visual features are indicative of facial feature points of the detected face of the driver. The input image including the detected face can be normalized. In a non-limiting embodiment the detected face is normalized, e.g., resized, to a 200×200 pixel square (e.g., image patch). In some embodiments, visual feature extraction includes extracting dense features from the detected face by applying a dense scale invariant feature transformation (SIFT) descriptor over dense grids upon the captured image data including the detected face of the driver. In a non-limiting example, the values of step size and bin size of the extracted features are set to 2 and 4, respectively. Utilization of the SIFT descriptor enables a larger set of local image descriptors to be computed over the dense grid to provide more information than corresponding descriptors evaluated at sparse sets of image points.

Referring to block 406, the extracted visual features are quantized using a dictionary of multiple visual words obtained by a clustering routine. Quantization is an encoding process to cluster the extracted visual features and generate code therefrom. In one embodiment, the dictionary of multiple visual words includes a 500-word visual word dictionary using a k-means clustering routine.

Referring to block 408, the quantized visual features of bock 406 are pooled to generate a spatial histogram of the visual words.

Block 410 classifies the generated spatial histogram of block 408 using the eye-glasses classifier to detect whether or not the driver is wearing eye-glasses. In the illustrated embodiment, the eye-glasses classifier includes a multi-class support vector machine (SVM) linear classifier. The multi-class SVM linear classifier may be trained using a plurality of trained images uniformly distributed. Each trained image includes a respective sampled face image corresponding to one of three classes, including the sampled face (1) not wearing eye glasses, (2) wearing regular eye glasses and (3) wearing sunglasses. Accordingly, the uniform distribution of the trained images includes three equal portions among the plurality of trained images, wherein each portion corresponds to a respective one of the three classes. Some of the plurality of trained images may be captured during low light or nighttime driving conditions. Moreover, the sampled face images are selected from a plurality of individuals from different ethnicity and possessing different variations in head pose.

Block 412 detects whether or not the driver is wearing eye glasses based on the classification of the spatial histogram using the glasses-classifier of block 410. The spatial histogram may be classified as the driver not wearing eye glasses 420, wearing regular eye glasses 430 or wearing sunglasses 440. When the spatial histogram is classified as the driver not wearing eye glasses, block 306 of FIG. 3 will execute the gaze-based EOTR detection method utilizing estimations of gaze direction of the driver since eye information of the driver can be accurately obtained. When the spatial histogram is classified as the driver wearing regular eye glasses or sunglasses 420, 430, respectively, block 308 will execute the direct EOTR detection method using the EOTR classifier to determine if the driver is looking off the road based on a driver face location.

Figure 5:
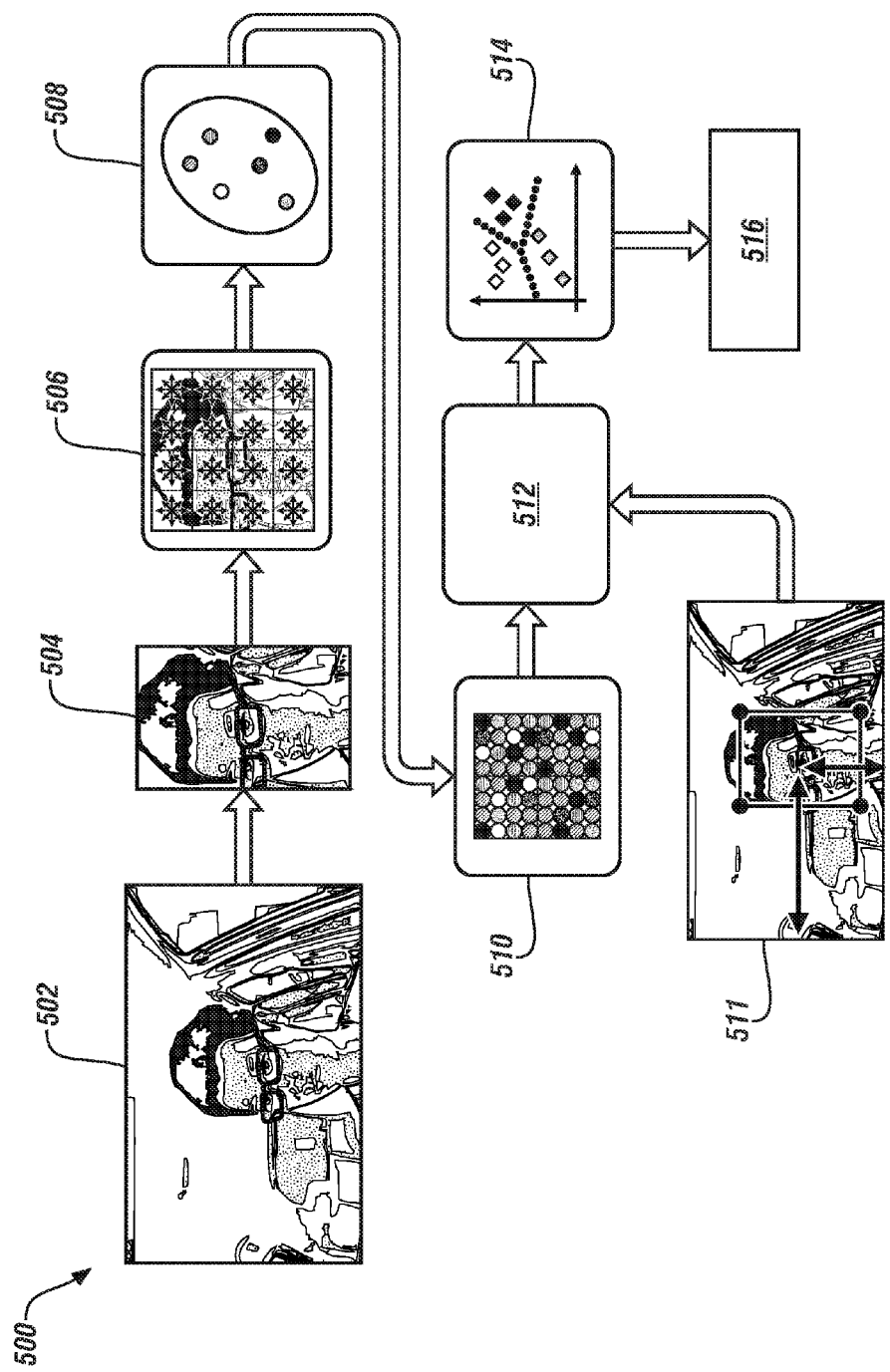
FIG. 5 illustrates an exemplary flowchart 500 of execution of a direct EOTR detection method of block 308 of FIG. 3 for detecting whether the EOTR condition exists using an EOTR classifier, in accordance with the present disclosure.

FIG. 5 illustrates an exemplary flowchart 500 of execution of the direct EOTR detection method of block 308 of FIG. 3 for detecting whether or not the EOTR condition exists using an EOTR classifier, in accordance with the present disclosure. The exemplary flowchart 500 can be implemented within, and executed by, the non-transitory processing device 15 of FIG. 1. Table 2 is provided as a key to FIG. 5 wherein the numerically labeled blocks and the corresponding functions are set forth as follows.

TABLE 2

| BLOCK | BLOCK CONTENTS |
|---|---|
| 502 | Obtaining image data captured by the camera device that corresponds to the driver. |
| 504 | Extracting a region of interest that includes a detected face of the driver using a face detector. |
| 506 | Extracting visual features from the captured image data. |
| 508 | Quantizing the extracted visual features using a dictionary of multiple visual words obtained by a clustering routine. |
| 510 | Pooling the quantized visual features to generate at least one spatial histogram of the visual words. |
| 511 | Detecting a driver face location from the detected face of the driver. |
| 512 | Generating a feature vector of the at least one spatial histogram of the visual words concatenated with the driver face location. |
| 514 | Classifying the feature vector using an EOTR classifier. |
| 516 | Detecting whether or not an EOTR condition exists based on the classified feature vector. |

It will be understood when the driver is wearing eye glasses, e.g., block 412 of FIG. 4 detects regular eye glasses 430 or sunglasses 440, estimation of a driver gaze direction is not obtainable or not reliable since eye information is obstructed due to the presence of eye glasses. Accordingly, detecting the EOTR condition using the gaze-based EOTR detection method is bypassed, and a pre-trained EOTR classifier is utilized instead to determine whether or not the EOTR condition exists. Described in further detail below, the EOTR classifier uses facial features of the driver extracted from the image data captured by the monocular camera device 10 of FIG. 1 to output a binary decision, e.g., whether or not the EOTR condition exists.

Referring to block 502, an input image including image data of the driver is captured by the camera device 10 of FIG. 1. A region of interest, or resizing, is extracted from the image data at block 504. The region of interest includes a detected face of the driver using a face detector. In a non-limiting embodiment the output of the face detector indicating the detected face is normalized, e.g., resized, to a 200×200 pixel square (e.g., image patch).

Block 506 extracts visual features from the captured image data. Specifically, the visual features are extracted from the region of interest indicative of facial feature points describing facial information of the driver. In some embodiments, visual feature extraction includes extracting dense features from the detected face by applying a dense scale invariant feature transformation (SIFT) descriptor over dense grids upon the captured image data including the detected face of the driver. In a non-limiting example, the values of step size and bin size of the extracted features are each set to 4. Utilization of the SIFT descriptor enables a larger set of local image descriptors to be computed over the dense grid to provide more information than corresponding descriptors evaluated at sparse sets of image points.

Referring to block 508, the extracted visual features are quantized using a dictionary of multiple visual words obtained by a clustering routine. Quantization is an encoding process to cluster the extracted visual features and generate code therefrom. In one embodiment, the dictionary of multiple visual words includes a 250-word visual word dictionary using a k-means clustering routine.

Block 510 pools the quantized visual features to generate at least one spatial histogram of the visual words. The at least one spatial histogram includes the visual words using the quantized visual features. The spatial histogram features of the visual words are specific to an object class, e.g., human faces, due to discriminative information of the object class being embedded into these features through measuring image similarity between the object class and a non-object class. Here, pose information of the driver can be determined from the extracted visual features of the detected face of the driver. In one embodiment, pooling the quantized image data generates a plurality of spatial histograms of the visual words using a spatial pyramid bag of visual words that includes a plurality of layers. Specifically, the plurality of spatial histograms are generated by partitioning the captured image data into increasingly refined sub-regions and generating the plurality of spatial histograms based on the increasingly refined sub-regions. Each sub-region includes respective ones of the plurality of spatial histograms. The sizes of the sub-regions depend on the number of layers used in the spatial pyramid bag of visual words. The spatial histograms respective to each layer are concatenated, resulting in a longer descriptor containing some geometric information of the captured image data, e.g., the region of interest indicative of the detected face of the driver. This geometric distribution of the captured image data using the visual words improves classification performance.

Figure 6:
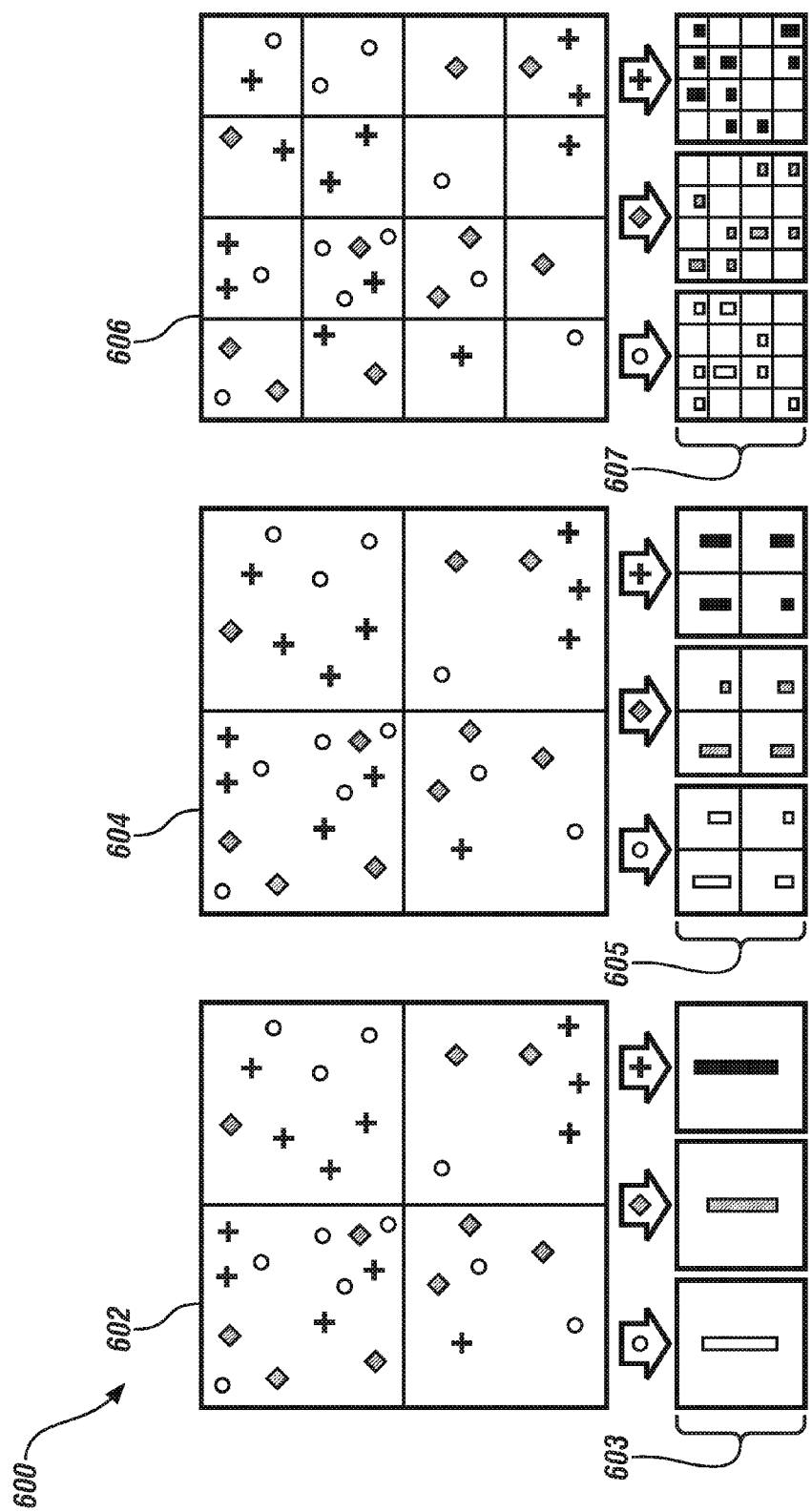
FIG. 6 illustrates an exemplary non-limiting embodiment for constructing a spatial pyramid bag of visual words to generate a plurality of spatial histograms, in accordance with the present disclosure.

FIG. 6 illustrates an exemplary non-limiting embodiment for constructing a spatial pyramid bag of visual words to generate a plurality of spatial histograms, as described above with reference to block 510 of FIG. 5. A first layer 602 is illustrated partitioned into one region and histograms 603 of visual words are illustrated for the first layer 602. A second layer 604 is illustrated increasing the region of the first layer 602 into four (4) sub-regions. Histograms 605 of visual words are illustrated for each of the four sub-regions of the second layer 606. A third layer 606 is illustrated increasing the four sub-regions of the second layer 604 into sixteen (16) sub-regions. Histograms 607 of visual words are illustrated for each of the sixteen sub-regions of the third layer 608. It will be appreciated that the three layers 602, 604 and 606 are depicted for illustrative purposes only, and this disclosure is not limited to any number of layers for the spatial pyramid bag of visual words.

Referring back to FIG. 5, block 511 detects a driver face location from the captured image input data that is indicative of a location of the detected face of the driver. It will be understood that the driver face location is a spatial measurement.

Referring to block 512, the at least one spatial histogram of the visual words of block 510 is concatenated with the driver face location of block 511 to generate a feature vector.

At block 514, the generated feature vector of block 512 is classified using the EOTR classifier. Specifically, the EOTR classifier is utilized to classify the feature vector to extract pose information for the detected face location. In the illustrated embodiment, the EOTR classifier includes a binary SVM linear classifier. The binary SVM linear classifier uses a plurality of trained images uniformly distributed. Each trained image comprises a respective sampled face image wearing eye glasses and corresponding to one of two classes. The two classes include the sampled face image where (1) the EOTR condition exists, e.g., the face image is indicative of a driver not having his/her eyes upon a road/driving scene, and (2) the EOTR condition does not exist, e.g., the face image is indicative of a driver as having his/her eyes upon the road/driving scene. Accordingly, the trained samples are equally distributed across both of the two classes. Some of the plurality of trained images may be captured during low light or nighttime driving conditions. Moreover, the sampled face images are selected from a plurality of individuals from different ethnicity and possessing different variations in head pose. Accordingly, the EOTR classifier is operative to estimate whether the a driver is looking on or off the road based on the feature vector's output and the spatial driver face location obtained from the captured image data.

Block 516 whether or not an EOTR condition exists based on the classified feature vector of block 514. When the EOTR condition is detected, an alarm or other measures can be taken to gain the attention of the driver such that the driver retains his/her eyes back upon the road scene.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for determining if an Eyes-Off-the-Road (EOTR) condition exists, comprising:
    capturing image data corresponding to a driver from a monocular camera device;
    detecting whether the driver is wearing eye glasses based on the image data using an eye glasses classifier, comprising:
        extracting visual features from the captured image data;
        quantizing the extracted visual features using a dictionary of multiple visual words obtained by a clustering routine;
        pooling the quantized visual features to generate a spatial histogram of the visual words; and
        classifying the spatial histogram using the eye-glasses classifier to detect whether the driver is wearing eye glasses; and
    when it is detected that the driver is wearing eye glasses:
        detecting a driver face location from the captured image data; and
        determining whether the EOTR condition exists based on the driver face location using an EOTR classifier.

2. The method of claim 1, wherein the visual features are extracted from the captured image data by:
    applying a dense scale invariant feature transformation (SIFT) descriptor over dense grids of the captured image data.

3. The method of claim 1, wherein the clustering routine comprises a k-means clustering routine.

4. The method of claim 1, wherein the eye-glasses classifier comprises a multi-class support vector machine (SVM) linear classifier.

5. The method of claim 4, further comprising:
    training the multi-class SVM linear classifier using a plurality of trained images uniformly distributed, wherein each training image comprises a respective sampled driver corresponding to one of three classes.

6. The method of claim 5, wherein the three classes comprise the sampled driver not wearing eye glasses, the sampled driver wearing regular eye glasses, and the sampled driver wearing sunglasses.

7. The method of claim 1, wherein determining whether the EOTR condition exists based on the driver face location using the EOTR classifier comprises:
    extracting visual features from the captured image data;
    quantizing the extracted visual features using a dictionary of multiple visual words obtained by a clustering routine;
    pooling the quantized visual features to generate at least one spatial histogram of the visual words;
    generating a feature vector of the at least one spatial histogram of the visual words concatenated with the driver face location; and
    classifying the feature vector using the EOTR classifier to determine whether the EOR condition exists.

8. The method of claim 7, wherein the visual features are extracted from the captured image data by:
    applying a dense scale invariant feature transformation (SIFT) descriptor over dense grids of the captured image data.

9. The method of claim 7, wherein the clustering routine comprises a k-means clustering routine.

10. The method of claim 7, wherein pooling the quantized image data to generate the spatial histogram of the visual words comprises:
    pooling the quantized image data to generate a plurality of spatial histograms of the visual words.

11. The method of claim 7, wherein the plurality of spatial histograms of the visual words are generated by:
    partitioning the captured image data into increasingly refined sub-regions; and
    generating the plurality of spatial histograms based on the increasingly refined sub-regions, wherein each sub-region includes respective ones of the plurality of spatial histograms.

12. The method of claim 7, wherein classifying the feature vector to determine whether the EOR condition exists comprises:
    classifying the feature vector to extract pose information for the detected face location.

13. The method of claim 1, wherein the EOTR classifier comprises a binary support vector machine (SVM) linear classifier.

14. The method of claim 13, further comprising:
training the binary SVM linear classifier using a plurality of trained images uniformly distributed, wherein each trained image comprises a respective sampled face image wearing eye glasses and corresponding to one of two classes.

15. The method of claim 14, wherein the two classes comprise the respective sampled face image indicative of a driver having eyes on the road and the respective sampled face image indicative of the driver having eyes off the road.

16. The method of claim 14, wherein a first portion of the plurality of trained images are captured during daytime and a remaining second portion of the plurality of trained images are captured during nighttime.

17. The method of claim 1, further comprising:
only when it is not detected that the driver is wearing eye glasses, determining whether the EOTR condition exists based on an estimated gaze direction of the driver.

18. An apparatus for determining if an Eyes-Off-the-Road (EOTR) condition exists, comprising:
an in-vehicle monocular camera device for capturing image data in a field of view directed toward a driver; and
a processing device configured to:
detect whether the driver is wearing eye glasses based on the image data using an eye glasses classifier, comprising:
extracting visual features from the captured image data;
quantizing the extracted visual features using a dictionary of multiple visual words obtained by a clustering routine;
pooling the quantized visual features to generate a spatial histogram of the visual words; and
classifying the spatial histogram using the eye-glasses classifier to detect whether the driver is wearing eye glasses; and
when it is detected that the driver is wearing eye glasses:
detect a driver face location from the captured image data; and
determine whether the EOTR condition exists based on the driver face location using an EOTR classifier.

19. The apparatus of claim 18, further comprising:
an infrared illuminator for illuminating the driver during low-light conditions.

\* \* \* \* \*